United States Patent [19]

Scheid

[11] Patent Number: 5,346,784
[45] Date of Patent: Sep. 13, 1994

[54] ELECTRONIC DEVICE HAVING AN INTEGRAL BATTERY DOOR/BELT CLIP ELEMENT

[75] Inventor: William J. Scheid, Coral Springs, Fla.

[73] Assignee: Motorola Inc., Schaumburg, Ill.

[21] Appl. No.: 976,121

[22] Filed: Nov. 13, 1992

[51] Int. Cl.5 ............................................. H01M 2/10
[52] U.S. Cl. ...................................... 429/98; 429/97; 429/100
[58] Field of Search ................................... 429/98, 100

[56] References Cited

U.S. PATENT DOCUMENTS

| | | | |
|---|---|---|---|
| 2,983,778 | 5/1961 | Munse | 429/178 |
| 3,693,089 | 9/1972 | Hutchinson et al. | 325/119 |
| 3,742,832 | 5/1973 | Stoneham et al. | 429/98 |
| 4,391,883 | 6/1983 | Williamson et al. | 429/97 |
| 4,584,250 | 4/1986 | Hooke et al. | 429/97 |
| 4,635,836 | 1/1987 | Mooney et al. | 229/252 R |
| 4,749,875 | 6/1988 | Itara | 429/98 |
| 4,752,539 | 6/1988 | Vatter | 429/98 |
| 4,880,712 | 11/1989 | Gordecki | 429/97 |
| 5,193,220 | 3/1993 | Ichinoke et al. | 429/98 |
| 5,244,755 | 9/1993 | Benoist | 429/97 |

OTHER PUBLICATIONS

Motorola, Inc. Manual No. 68P81006C30-A, entitled, Pageboy II fm radio pager A03FNC Series, Copyright 1974, pp. 7 and 21.
Motorola, Inc. Manual No. 68P81030C80-0, entitled, Pageboy III Tone & Voice Radio Pager, Copyright 1985, pp. 10 and 11.

Primary Examiner—David B. Springer
Attorney, Agent, or Firm—Kelly A. Gardner; Thomas G. Berry

[57] ABSTRACT

A battery powered device (100) includes electronic circuitry (410, 215), a battery (210) coupled to and powering the electronic circuitry (410, 215), and a housing (105) for partially enclosing the battery (210). The battery powered device (100) further includes a battery door/belt clip element (110) comprising a battery door (115) for enclosing the battery (210) within the housing (105) and a belt clip (120) formed contiguously therefrom.

13 Claims, 2 Drawing Sheets

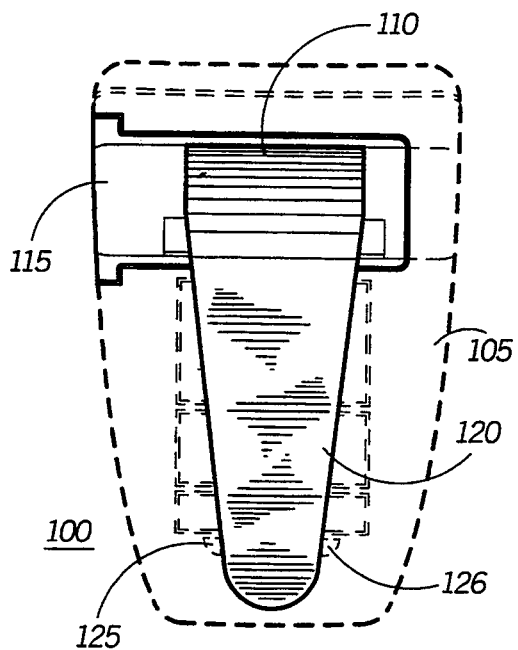
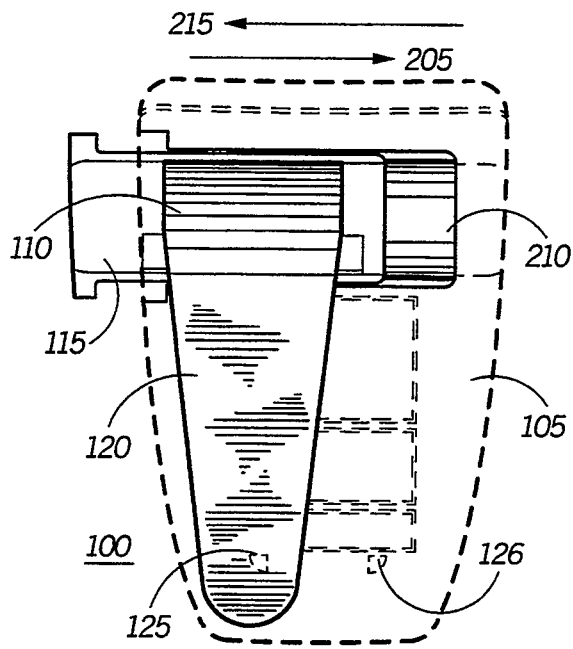
FIG.1  FIG.2
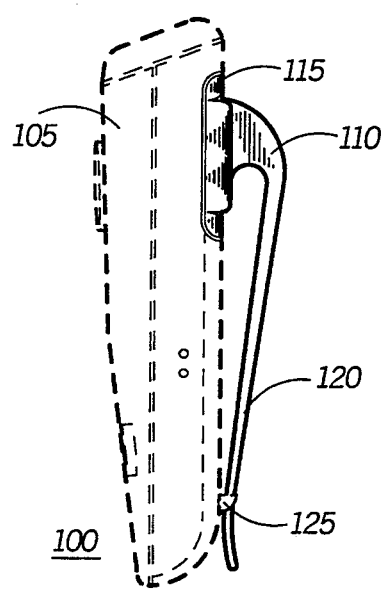
FIG.3

ELECTRONIC DEVICE HAVING AN INTEGRAL BATTERY DOOR/BELT CLIP ELEMENT

FIELD OF THE INVENTION

This invention relates in general to battery powered electronic devices, and more specifically to an electronic device having an integral battery door/belt clip element.

BACKGROUND OF THE INVENTION

Conventional communication receivers, i.e., pagers, are electronic devices by which users may receive selective call messages. Because most pagers are intended for portable use, batteries are typically utilized for powering the electronic circuitry included within the pager. Due to the space constraints of portable pagers, these batteries are often very small, resulting in a relatively short battery life. Therefore, the user of a pager must be able to access the battery for removal and replacement purposes. It is undesirable, however, for the battery to be exposed at all times, because the battery could accidentally drop from the pager, thus causing the electrical failure of the pager, or foreign matter, such as rain or dirt, could intrude and cause a pager malfunction. As a result, conventional pagers utilize a removable battery door for enclosing the battery within a pager housing during normal operation of the pager. When the battery is to be replaced, the battery door is removed by the user to allow access to the battery.

Conventional pagers also commonly include belt clips by which a user may fasten a pager to a belt or other article of clothing to easily carry the pager. Typically, a belt clip is manufactured as a separate pager component and is fastened, during manufacture of the pager, to the pager housing in such a manner that a belt inserted between the belt clip and housing is held therebetween by the belt clip. This additional part, like the aforementioned battery door, is purchased and stocked separately from other pager components, resulting in an increase in product cost. Additionally, the labor-intensive processes typically utilized to attach the belt dip to the pager housing further increase the product cost.

Thus, what is needed is an alternate method by which a belt dip could be manufactured and assembled to a pager housing. Accordingly, there exists an opportunity for combining a battery door and a belt clip into a single element, thereby decreasing the number of parts included within a pager and simplifying the assembly of the pager.

SUMMARY OF THE INVENTION

A portable communication receiver for receiving selective call messages includes receiving circuitry for receiving a radio frequency (RF) signal and recovering therefrom a selective call message, a battery coupled to and powering the receiving circuitry, and a housing in which the battery is situated. The portable communication receiver further includes a removable battery door/belt clip element for providing the dual functions of enclosing the battery and attaching to an external article. The removable battery door/ belt clip element comprises a battery door for enclosing the battery within the housing and a belt clip formed contiguously therefrom for attaching the portable communication receiver to the external article.

An improved portable communication receiver for receiving selective call messages includes receiving circuitry powered by a battery and enclosed by a housing in which the battery is situated. The improvement comprises a removable battery door/belt clip element for providing the dual functions of enclosing the battery and attaching to an external article. The removable battery door/belt clip element includes a battery door for enclosing the battery within the housing and a belt clip formed contiguously therefrom for attaching the portable communication receiver to the external article.

A portable communication receiver for receiving selective call messages comprises a housing for enclosing receiving circuitry and in which a battery is situated. The housing includes aback surface having a rectangular, longitudinal opening of sufficient size for insertion and removal of the battery within the housing and a removable battery door/belt clip element having a planar, rectangular battery door for enclosing the battery within the housing. The battery door slides transversely across the back surface of the housing to cover the opening. The removable battery door/belt clip element also has a belt clip integrally formed from the battery door for attaching to an external article. The belt clip includes a first member extending outward from the battery door and a second elongated member having first and second ends at opposite ends thereof, the first end being integrally formed from the first member and being curved towards the housing such that the second end contacts the back surface of the housing when the battery door encloses the battery within the housing, wherein the back surface of the housing, the first member, and the second elongated member define a space in which the external article is secured.

BRIEF DESCRIPTION OF THE DRAWINGS

FIG. 1 depicts a portable communication receiver which utilizes a battery door/belt clip element in accordance with a preferred embodiment of the present invention.

FIG. 2 shows the battery door/belt clip element of FIG. 1 when partially assembled to the communication receiver of FIG. 1 in accordance with the preferred embodiment of the present invention.

FIG. 3 is a side view of the communication receiver and the battery door/belt dip element of FIG. 1 in accordance with the preferred embodiment of the present invention.

DESCRIPTION OF A PREFERRED EMBODIMENT

Figure 4:
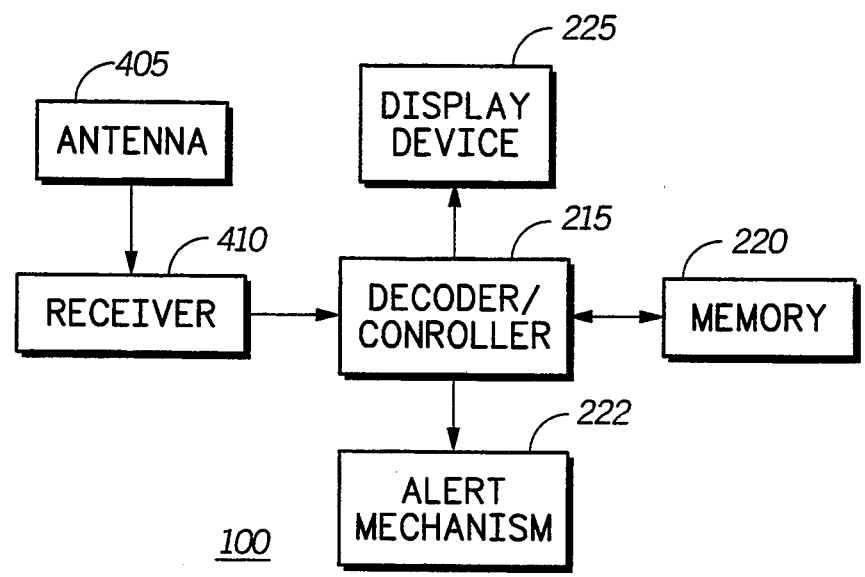
FIG. 4 is an electrical block diagram of electronic circuitry included within the communication receiver of FIG. 1 in accordance with the preferred embodiment of the present invention.

FIG. 1 depicts a battery powered electronic device, such as a portable communication receiver 100, which preferably comprises a housing 105 for enclosing electronic circuitry and a removable battery door/belt clip element 110. In accordance with the preferred embodiment of the present invention, the battery door/belt clip element 110 includes a battery door 115 for enclosing a battery (not shown) within the housing 105 and a belt clip 120 for securing the communication receiver 100 to a belt or other article of clothing such that it may be easily carried by a user. The belt clip 120 is, according to the present invention, contiguously formed from the battery door 110. When the battery door 115 encloses the battery within the housing 105, the belt clip 120 engages protrusions 125, 126 formed on the housing 105 and thereby secures the battery door/belt clip element 110 to the housing 105. Both the housing 105 and the battery door/belt clip element 110 are preferably formed from a thermoset plastic material, such as polycarbonate, although it may be appreciated that other materials, such as ABS plastics, may be utilized as well.

The battery door/belt clip element 110 is, in accordance with the preferred embodiment of the present invention, a single component which performs two different functions, i.e., that of a battery door and that of a belt clip. In conventional communication receivers, on the other hand, belt clips and battery doors are separate elements which must be purchased and stocked separately. Additionally, conventional battery doors and belt clips are independently assembled to the housing of a communication receiver, which causes an increase in the complexity and cost of manufacturing processes for typical communication receivers. The communication receiver 100 according to the present invention advantageously utilizes the single battery door/belt clip element 110, rather than a separate battery door and belt clip, and therefore only a single element, i.e., the battery door/belt clip element 110, needs to be assembled to the housing 105.

Referring next to FIG. 2, the battery door/belt clip element 110 is, in accordance with the preferred embodiment of the present invention, shown partially assembled to the housing 105 through use of an assembly process in which the battery door 115 is inserted within grooves (not shown) in the housing 105. As the battery door 115 slides within the grooves in a first direction 205, the belt clip 120 is deflected by and slides over the protrusion 125 until the battery door 115 is slideably moved into a closed position (FIG. 1) in which the battery 210 is completely covered and inaccessible to the user. When the battery door 115 is in the closed position, the belt clip 120, as described above, engages the protrusions 125, 126 to secure the battery door/belt clip element 110 to the housing 105 in a closed position. To access the battery 210, the user slides the battery door/belt clip element 110 in a second direction 215 while lifting the belt clip 120 over the protrusion 125, as may be better understood by referring to FIG. 3.

FIG. 3 is a side view of the communication receiver 100. As shown, the protrusions 125, 126 preferably extend past the belt clip 120 when the belt clip 120 engages the protrusions 125, 126 to secure the battery door/belt clip element 110 to the housing 105. Therefore, the battery door/belt clip element 110 is protected from accidental removal from the housing 105. Furthermore, because the protrusions 125, 126 are formed on the housing 105, additional fastening devices, such as screws or pins, are not necessary to lock the battery door/belt clip element 110 to the housing 105.

The electronic circuitry enclosed within the housing 105 preferably enables the communication receiver 100 to receive and present selective call messages to the user, as may be better understood by referring to FIG. 4, which is an electrical block diagram of the electronic circuitry included within the communication receiver 100 according to the present invention. The communication receiver 100 comprises an antenna 405 for receiving a radio frequency (RF) signal and a receiver 410 coupled to the antenna 405 for demodulating the RF signal in a manner well known to one of ordinary skill in the art. The demodulated signal is then provided to a decoder/controller 415, which recovers a selective call message from the demodulated signal and stores it in a memory 420 coupled to the decoder/controller 415. Upon recovery of the selective call message, the decoder/controller 415 also activates an alert mechanism 422, e.g., a transducer, to generate a sensible alert announcing to a user that a selective call message has been received. The message may be subsequently retrieved from the memory 420 and provided to a display device 425, such as a liquid crystal display, for presentation to the user, as is well known in the art.

Although, in the preferred embodiment of the present invention, the battery door/belt clip element 110 is described as being utilized by the communication receiver 100, in alternate embodiments of the present invention, the battery door/belt clip element 110 may also be utilized by other battery powered portable devices. For instance, cellular phones and two-way radios, which are usually carried by a user, may benefit from the present invention.

Figures 5, 6:
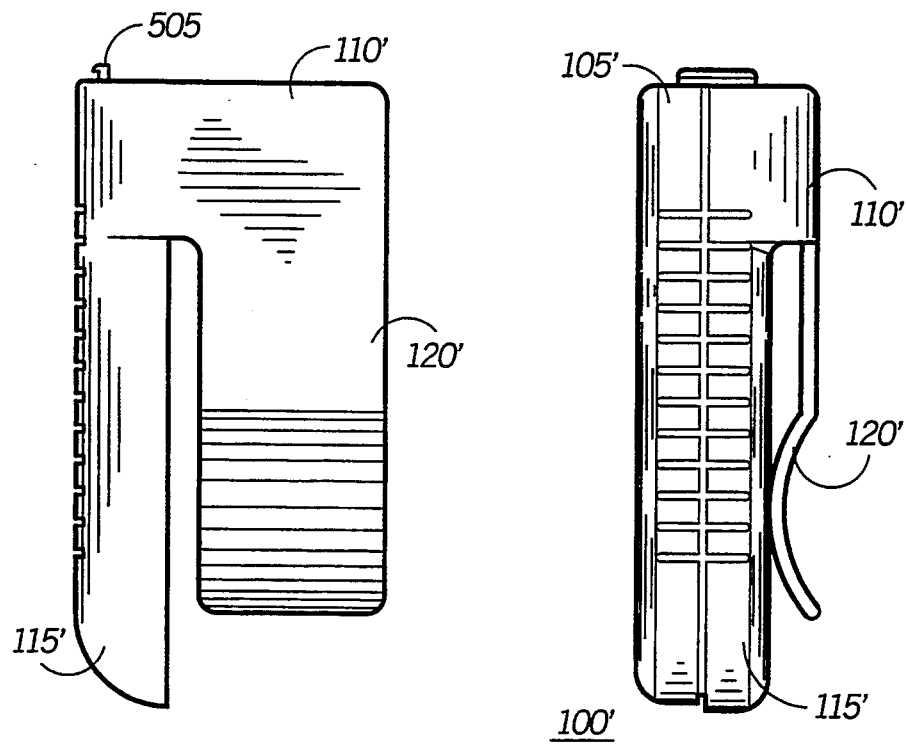
FIG. 5 depicts a battery door/belt dip element in accordance with an alternate embodiment of the present invention.
FIG. 6 is a side view of a communication receiver utilizing the battery door/belt clip element of FIG. 5 in accordance with the alternate embodiment of the present invention.

With reference to FIG. 5, a battery door/belt clip element 110' in accordance with an alternate embodiment of the present invention is depicted. The battery door/belt clip element 110' comprises a battery door 115' and a belt clip 120' contiguously formed therefrom. This battery door/belt clip element 110', like the battery door/belt clip element 110 (FIG. 1) in accordance with the preferred embodiment, slideably engages grooves formed in a housing of a communication receiver and moves between an open position, in which a battery is accessible to a user, and a closed position, in which the battery is enclosed by the battery door 115' and the housing. In the closed position, a latch mechanism 505 formed on the battery door 115', preferably in an upper portion of the battery door 115', engages the housing to secure the battery door/belt clip element 110' to the housing, as is shown in FIG. 6. It will be appreciated that additional locking fixtures may be provided as well.

FIG. 6 is a side view of a communication receiver 100', in accordance with the alternate embodiment of the present invention, which utilizes the battery door/belt clip element 110'. Unlike the battery door/belt clip element 110 of FIG. 1, which opens transversely across a back surface of the housing 105 (FIG. 1), the battery door/belt clip element 110' shown in FIG. 6 encloses a battery which is accessible through the side, rather than the back, of the housing 105'. Further alternate embodiments of the present invention may allow the battery to be accessed through various other housing surfaces as well. According to the present invention, when the battery door 115' is in the closed position, the user is able to conveniently fasten the belt clip 120' to a belt or other article of clothing to easily carry the communication receiver 100'.

In summary, a portable electronic device, such as a communication receiver, according to the present invention utilizes an integral battery door/belt clip element to perform two distinct functions. The battery door portion of the battery door/belt clip element is utilized to cover a battery which powers the electronic device. The belt clip portion, which is contiguously formed from the battery door, may be fastened to an article of clothing such that a user may carry the electronic device. Because this single component, i.e., the battery door/belt clip element, performs two different functions, a separate battery door and belt clip, which are utilized by typical portable electronic devices, are not needed. Therefore, only a single part, rather than two separate parts, is assembled to the housing of the electronic device during the manufacture of the electronic device, saving money and time. Furthermore, the electronic device according to the present invention does not rely upon screws or other fastening devices, e.g., roll pins, to secure the battery door/belt clip element to the housing. In the preferred embodiment of the present invention, protrusions formed on the housing may engage the belt clip portion to secure the battery door/belt clip element in place. In an alternate embodiment, a latch mechanism is formed on the battery door portion to engage the housing. As a result, the process by which the battery door/belt clip element is assembled to the housing is simple compared to labor-intensive assembly processes, such as insertion of screws, often utilized by conventional electronic devices.

It may be appreciated by now that there has been provided a method for combining a battery door and a belt clip into a single element, thereby decreasing the number of parts included within an electronic device and simplifying the assembly of the electronic device.

I claim:

1. A portable communication receiver for receiving selective call messages, comprising:
   receiving circuitry for receiving a radio frequency (RF) signal and recovering therefrom a selective call message;
   a battery coupled to and powering the receiving circuitry;
   a housing in which the battery is situated; and
   a removable battery door/belt clip element for providing the dual functions of enclosing the battery and attaching to an external article, the removable battery door/belt clip element comprising:
      a battery door for enclosing the battery within the housing; and
      a belt clip formed contiguously therefrom for attaching the portable communication receiver to the external article.

2. The portable communication receiver according to claim 1, wherein the removable battery door/belt clip element is formed from a thermoset plastic material.

3. The portable communication receiver according to claim 1, further comprising a locking mechanism for locking the removable battery door/belt clip element to the housing when the battery is enclosed within the housing by the battery door, wherein the locking mechanism comprises protrusions formed on the housing such that the belt clip engages the protrusions when the battery is enclosed within the housing by the battery door.

4. The portable communication receiver according to claim 1, further comprising a locking mechanism for locking the removable battery door/belt clip element to the housing when the battery is enclosed within the housing by the battery door, wherein the locking mechanism comprises a latch formed on the battery door for engaging the housing when the battery is enclosed within the housing by the battery door.

5. A portable communication receiver for receiving selective call messages, comprising:
   receiving circuitry, comprising:
      an antenna for receiving a radio frequency (RF) signal;
      a receiver coupled to the antenna for demodulating the received RF signal; and
      a decoder coupled to the receiver for decoding a selective call message included within the RF signal;
   a battery coupled to and powering the receiving circuitry;
   a housing in which the battery is situated;
   a removable battery door/belt clip element for providing the dual functions of enclosing the battery and attaching to an external article, the removable battery door/belt clip element comprising:
      a battery door for enclosing the battery within the housing; and
      a belt clip formed contiguously therefrom for attaching the portable communication receiver to the external article; and
   a locking mechanism for locking the removable battery door/belt clip element to the housing when the battery is enclosed within the housing by the battery door.

6. The portable communication receiver according to claim 5, wherein the locking mechanism comprises protrusions formed on the housing such that the belt clip engages the protrusions when the battery is enclosed within the housing by the battery door.

7. The portable communication receiver according to claim 5, wherein the locking mechanism comprises a latch formed on the battery door for engaging the housing when the battery is enclosed within the housing by the battery door.

8. An improved portable communication receiver for receiving selective call messages, the portable communication receiver having receiving circuitry powered by a battery and enclosed by a housing in which the battery is situated, wherein the improvement comprises:
   a removable battery door/belt clip element for providing the dual functions of enclosing the battery and attaching to an external article, the removable battery door/belt clip element comprising:
      a battery door for enclosing the battery within the housing; and
      a belt clip formed contiguously therefrom for attaching the portable communication receiver to the external article.

9. The improved portable communication receiver according to claim 8, wherein the improvement further comprises a locking mechanism for locking the removable battery door/belt clip element to the housing when the battery is enclosed within the housing by the battery door, wherein the locking mechanism comprises protrusions formed on the housing such that the belt clip engages the protrusions when the battery is enclosed within the housing by the battery door.

10. The improved portable communication receiver according to claim 8, wherein the improvement further comprises a locking mechanism for locking the removable battery door/belt clip element to the housing when the battery is enclosed within the housing by the battery door, wherein the locking mechanism comprises a latch formed on the battery door for engaging the housing when the battery is enclosed within the housing by the battery door.

11. A portable communication receiver for receiving selective call messages, the portable communication receiver comprising:

a housing for enclosing receiving circuitry and in which a battery is situated, the housing comprising a back surface having a rectangular, longitudinal opening of sufficient size for insertion and removal of the battery within the housing; and a removable battery door/belt clip element, comprising:

a planar, rectangular battery door for enclosing the battery within the housing, wherein the battery door slides transversely across the back surface of the housing to cover the opening; and a belt clip integrally formed from the battery door for attaching to an external article, the belt clip comprising a first member extending outward from the battery door and a second elongated member having first and second ends at opposite ends thereof, the first end being integrally formed from the first member and being curved towards the housing such that the second end contacts the back surface of the housing when the battery door encloses the battery within the housing, wherein the back surface of the housing, the first member, and the second elongated member define a space in which the external article is secured.

12. The portable communication receiver according to claim 11, wherein:

the back surface of the housing has integrally formed therefrom two protrusions for latching the removable battery door/belt clip to the housing, wherein each of the two protrusions has an inner surface; and the second end of the second elongated member is held between the inner surfaces of the two protrusions when the battery door encloses the battery within the housing.

13. A portable communication receiver for receiving selective call messages, the portable communication receiver comprising:

a housing having front, back, and side surfaces defining a cavity in which receiving circuitry and a battery are situated, and further having a longitudinal opening bounded by edges of the back surface and one of the side surfaces, wherein the longitudinal opening is of sufficient size for insertion and removal of the battery within the housing; and a removable battery door/belt clip element, comprising:

a battery door for enclosing the battery within the housing, wherein edges of the battery door conform to the edges of the back surface and the one side surface bounding the longitudinal opening such that the battery door covers the longitudinal opening when in a closed position, and wherein the battery door has formed thereon a latch mechanism for securing the battery door to the housing when in the closed position; and a belt clip integrally formed from the battery door for attaching to an external article, the belt clip comprising a first member extending outward from the battery door in a plane perpendicular to the back surface of the housing and a second elongated member comprising a first end integrally formed from the first member in a plane parallel to the back surface, the belt clip further comprising a semicircular member formed at an end of the second elongated member, the semicircular member having an outer surface for contacting the back surface of the housing to secure the external article between the back surface, the second elongated member, and the first member.

* * * * *